(12) United States Patent
Batarseh

(10) Patent No.: US 11,304,567 B2
(45) Date of Patent: Apr. 19, 2022

(54) CUTTING BOARD SYSTEM WITH BOWL/CONTAINER ATTACHMENT RING

(71) Applicant: Joseph Batarseh, Folsom, CA (US)

(72) Inventor: Joseph Batarseh, Folsom, CA (US)

( * ) Notice: Subject to any disclaimer, the term of this patent is extended or adjusted under 35 U.S.C. 154(b) by 26 days.

(21) Appl. No.: 17/017,869

(22) Filed: Sep. 11, 2020

(65) Prior Publication Data

US 2022/0079388 A1 Mar. 17, 2022

(51) Int. Cl.
*A47J 47/00* (2006.01)
*A47J 47/16* (2006.01)

(52) U.S. Cl.
CPC ............. *A47J 47/005* (2013.01); *A47J 47/16* (2013.01)

(58) Field of Classification Search
CPC .................................. A47J 47/005; A47J 47/16
See application file for complete search history.

(56) References Cited

U.S. PATENT DOCUMENTS

| | | | | |
|---|---|---|---|---|
| D852,010 | S * | 6/2019 | Banovic | D7/698 |
| 2009/0051095 | A1 * | 2/2009 | O'Shea | A21C 9/08 269/302.1 |
| 2016/0331185 | A1 * | 11/2016 | Anderson | A47J 47/005 |
| 2020/0315405 | A1 * | 10/2020 | Fiola | A47J 47/005 |

FOREIGN PATENT DOCUMENTS

DE 2804421 A1 * 8/1979 ............ A47J 47/005

* cited by examiner

*Primary Examiner* — Nirvana Deonauth
(74) *Attorney, Agent, or Firm* — Craig A. Simmermon

(57) ABSTRACT

Cutting board system with bowl/container attachment ring is a cutting board or butcher block with a free floating rigid bowl/container attachment ring around the perimeter of the cutting board or butcher block that is used to reversibly attach a special bowl or container thereto. The rigid free floating bowl/container attachment ring is a strong and sturdy support member that will not bend, twist, or deflect under the pressure of rigorous use of the cutting board or butcher block. Rigid free floating bowl/container attachment ring works in tandem with an L-shaped flange or rib on a bowl or container wherein the L-shaped flange or rib on a bowl or container is reversibly attachable to the rigid free floating bowl/container attachment ring. It is an optional aspect of cutting board system with bowl/container attachment ring to include a series of interchangeable multicolored cutting surfaces that may be placed on top of cutting board wherein certain colored cutting surfaces are used solely or specifically with certain foods or food groups in order to prevent cross contamination of the cutting board or butcher block between foods or food groups.

4 Claims, 6 Drawing Sheets

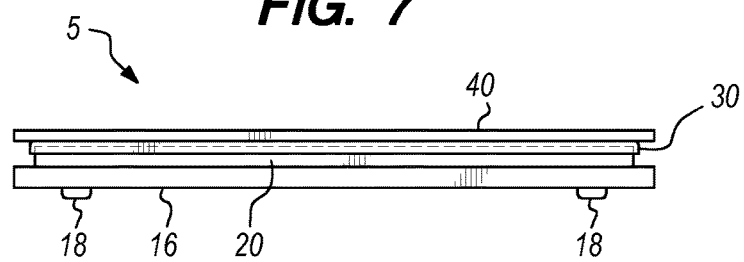
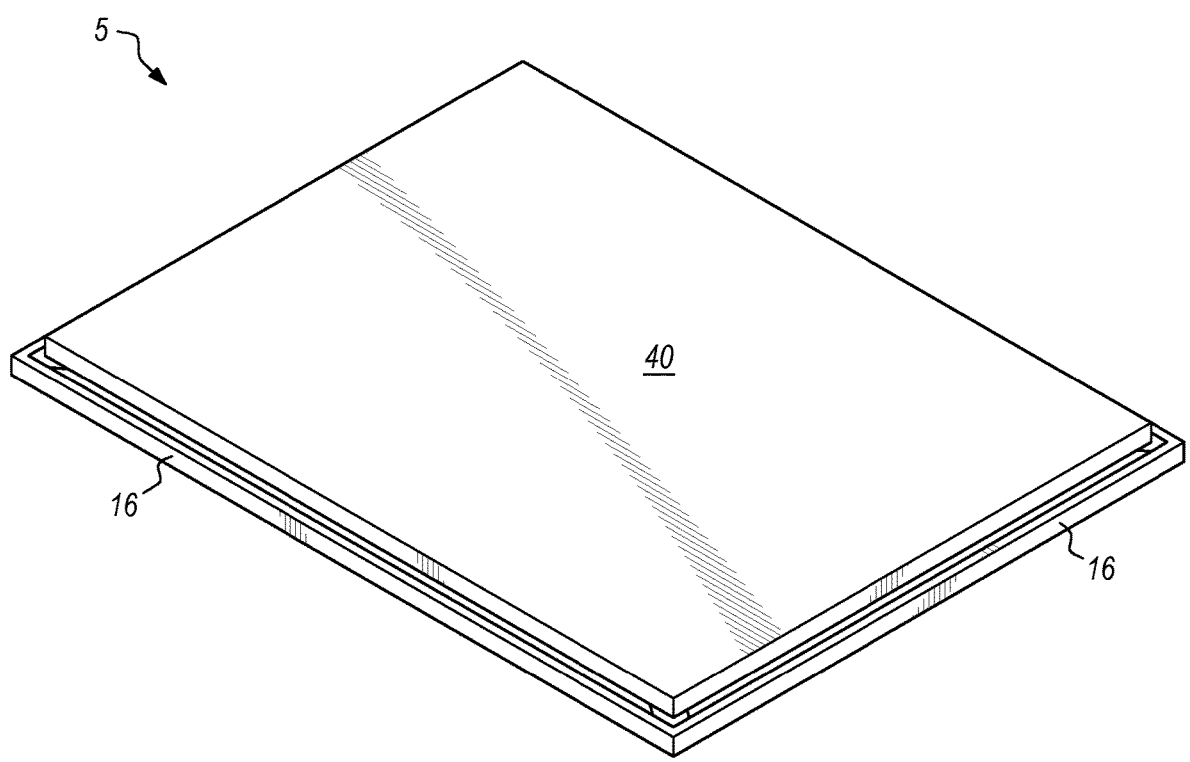

CUTTING BOARD SYSTEM WITH BOWL/CONTAINER ATTACHMENT RING

BACKGROUND OF THE INVENTION

1. Field of the Invention

This invention relates to cutting boards or butcher blocks and specifically to a cutting board or butcher block with a free floating rigid bowl/container attachment member around the perimeter of the cutting board or butcher block that is used to reversibly attach a special bowl or container thereto. The special bowl or container has an L-shaped flange or rib that is reversibly attachable to the free floating rigid bowl/container attachment member.

2. Description of Related Art

There are many cutting boards and butcher blocks butcher blocks in the prior art and there are cutting boards or butcher blocks with structure or mechanisms used to reversibly attach bowls or containers thereto, however, there are none that use the structure and mechanisms described below to reversibly attach bowls or containers to a cutting board or butcher block with a free floating rigid bowl/container attachment member.

BRIEF SUMMARY OF THE INVENTION

It is an aspect of cutting board system with bowl/container attachment member to include a cutting board with a rigid free floating bowl/container attachment member.

It is an aspect of rigid free floating bowl/container attachment member to be a strong and sturdy support member that will not bend, twist, or deflect under the pressure of rigorous use of the cutting board or the heavy weight of a bowl or container filled with food attached thereto.

It is an aspect of rigid free floating bowl/container attachment member to work in tandem with an L-shaped flange or rib on a bowl or container wherein the L-shaped flange or rib on a bowl or container is reversibly attachable to the rigid free floating bowl/container attachment member.

It is an aspect of cutting board system with bowl/container attachment member to include at least one bowl or container with an L-shaped flange or rib.

It is an aspect of L-shaped flange or rib on the bowl or container to reversibly attach to the bowl/container attachment member on the cutting board.

It is an aspect of the connection between L-shaped flange or rib and bowl/container attachment member to allow for food to be transferred, slid, or pushed from the cutting board into the bowl or container without spilling or dripping food outside of the bowl or container.

It is an optional aspect of cutting board system with bowl/container attachment member to include a series of interchangeable multicolored cutting surfaces that may be placed on top of cutting board wherein certain colored cutting surfaces may be used solely or specifically with certain foods or food groups in order to prevent cross contamination of the cutting board or butcher block between foods or food groups.

It is an optional aspect of cutting board system with bowl/container attachment member to include an anti-slip pad that may be placed between the cutting board and the interchangeable multicolored cutting surfaces in order to prevent each interchangeable multicolored cutting surface from sliding or moving on the cutting board when in use.

BRIEF DESCRIPTION OF THE DRAWINGS

FIG. 7 is a left side elevation view of best mode cutting board system with bowl/container attachment member with an optional anti-slip pad and an optional cutting surface and without a bowl or container, the right side elevation view being a mirror image thereof.

FIG. 8 is a top perspective view of best mode cutting board system with bowl/container attachment member with an optional anti-slip pad and an optional cutting surface and without a bowl or container.

DEFINITION LIST

Figure 1:
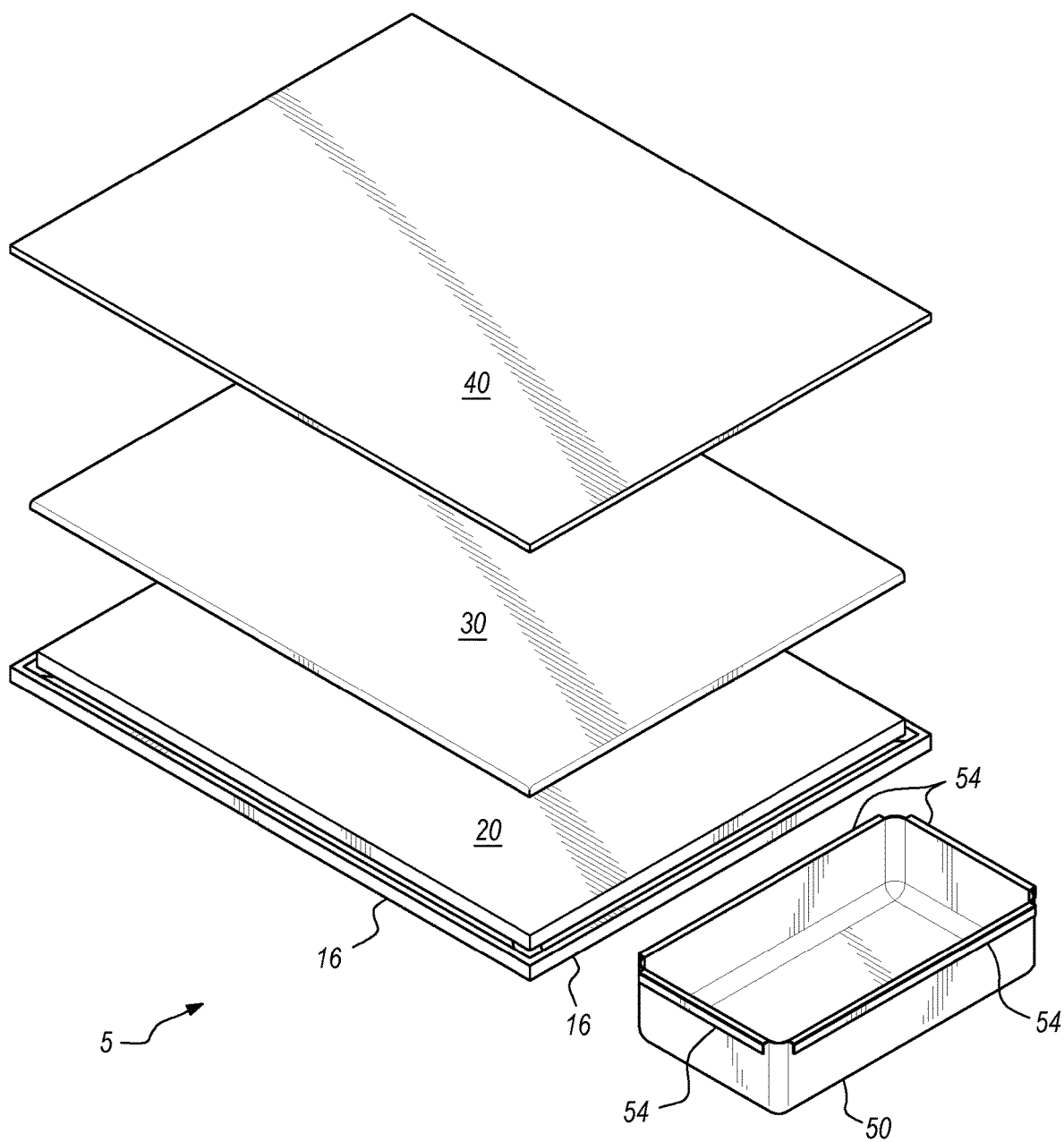
FIG. 1 is an exploded top perspective view of best mode cutting board system with bowl/container attachment member with an optional anti-slip pad and an optional cutting surface.
Figure 2:
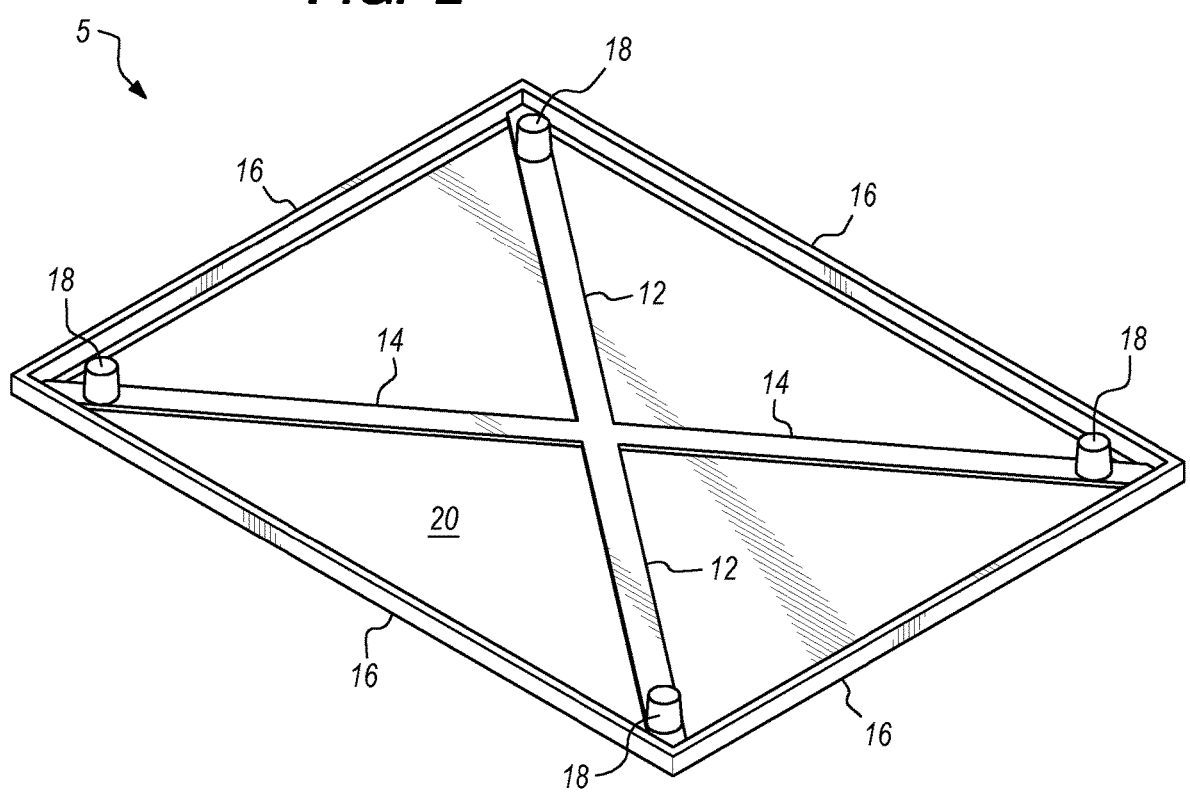
FIG. 2 is a bottom perspective view of cutting board system with bowl/container attachment member without a bowl or container.
Figure 3:
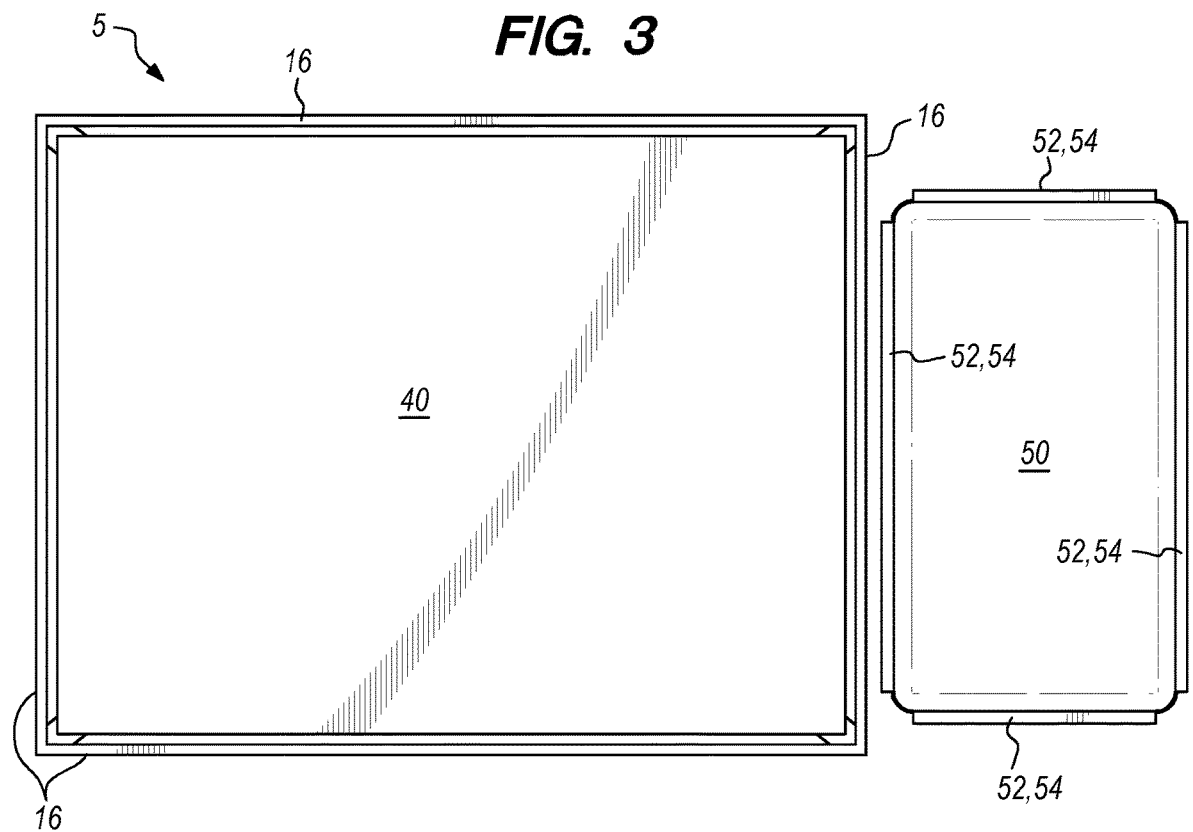
FIG. 3 is a top plan view of cutting board system with bowl/container attachment member.
Figure 4:
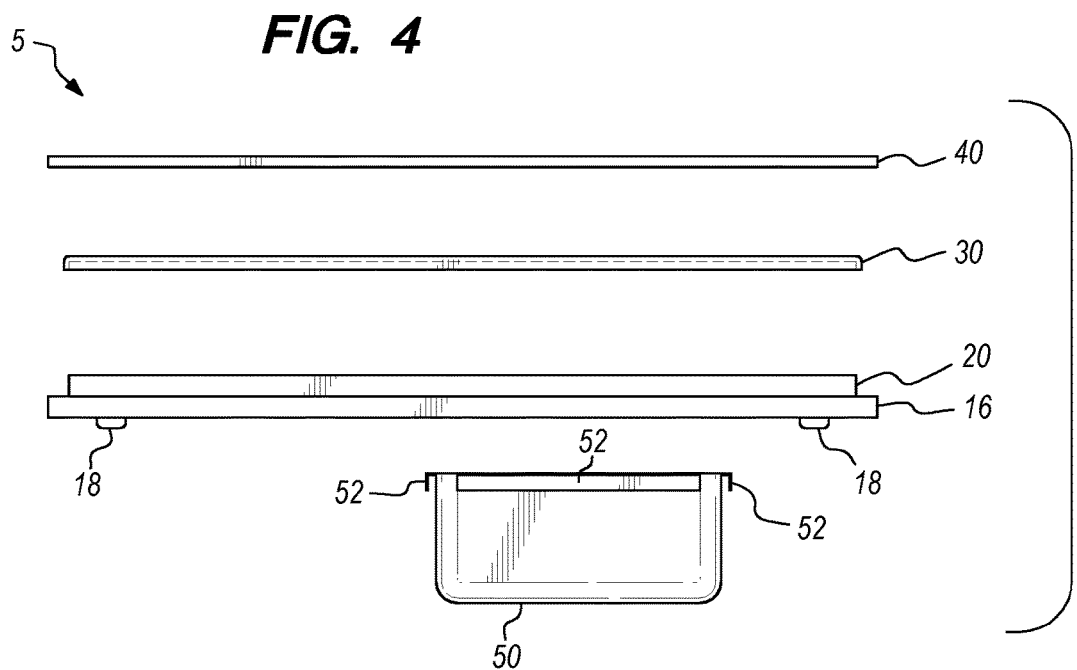
FIG. 4 is an exploded front elevation view of best mode cutting board system with bowl/container attachment member with an optional anti-slip pad and an optional cutting surface, the rear elevation view being a mirror image thereof.
Figure 5:
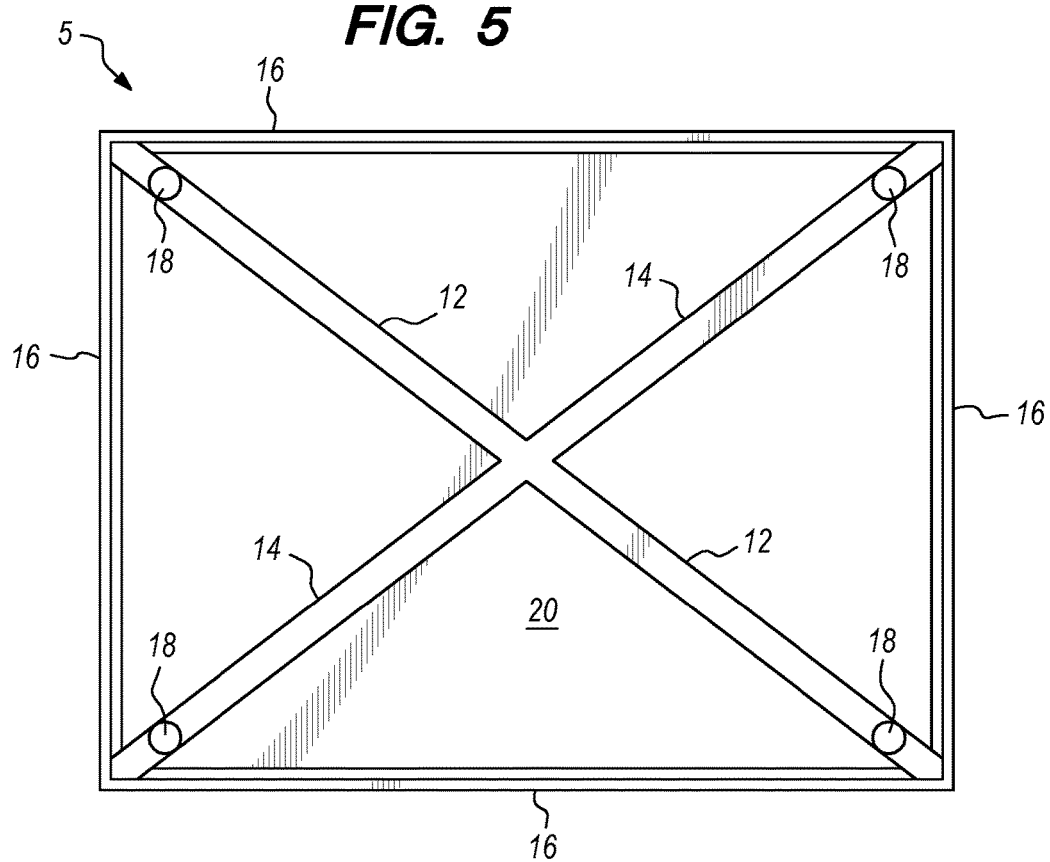
FIG. 5 is a bottom plan view of cutting board system with bowl/container attachment member without a bowl or container.
Figure 6:
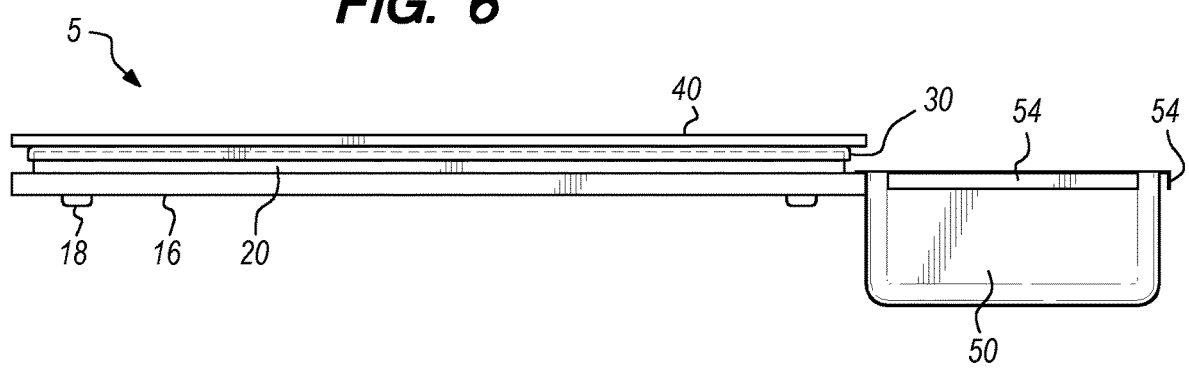
FIG. 6 is a front or rear elevation view of best mode cutting board system with bowl/container attachment member with an optional anti-slip pad and an optional cutting surface, the rear elevation view being a mirror image thereof.
Figure 9:
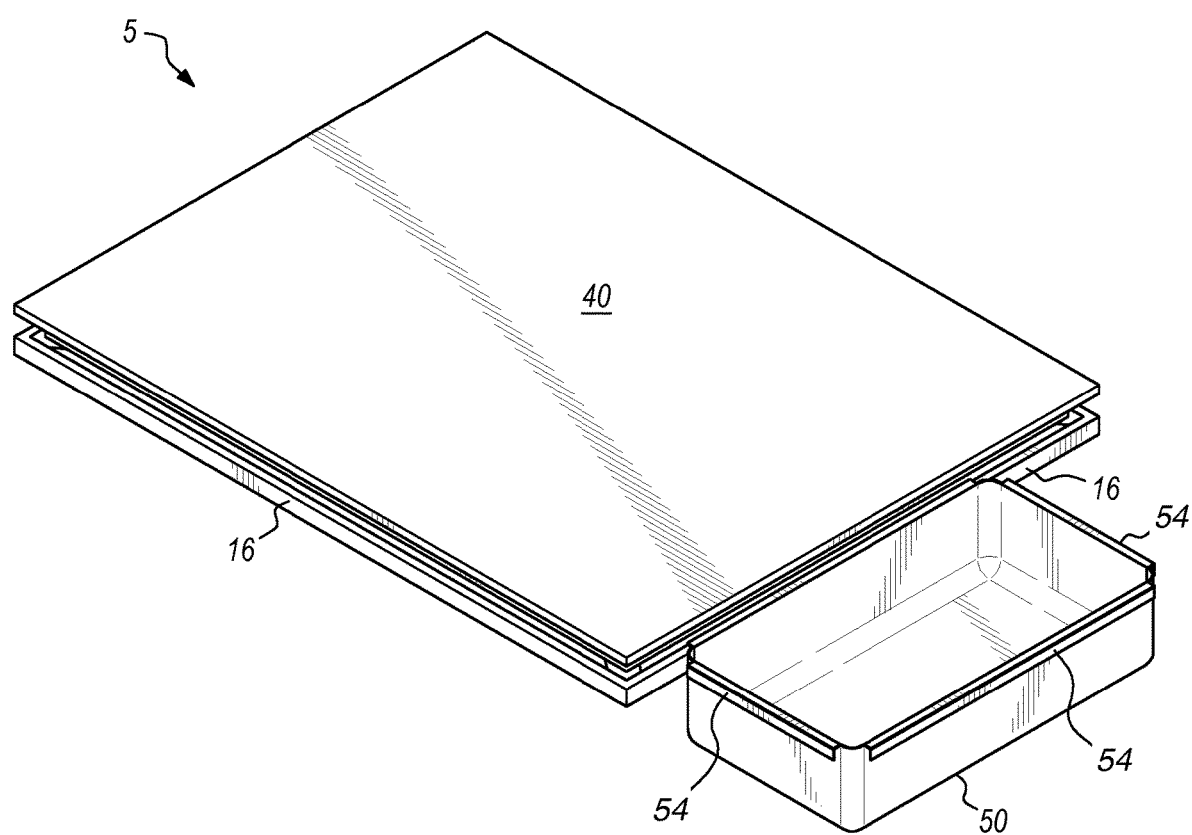
FIG. 9 is a top perspective view of best mode cutting board system with bowl/container attachment member with an optional anti-slip pad and an optional cutting surface with bowl or container attached to bowl/container attachment member.

| | Definition |
|---|---|
| 5 | Cutting Board System with Bowl/Container Attachment Member |
| 12 | First Diagonal Support |
| 14 | Second Diagonal Support |
| 16 | Bowl/Container Attachment Member |
| 18 | Elastomeric or Rubber Foot |
| 20 | Block |
| 30 | Anti-Slip Pad |
| 40 | Cutting Surface |
| 50 | Bowl or Container |
| 52 | Straight Brim, Edge or Rim |
| 54 | L-Shaped Flange or Rib |

DETAILED DESCRIPTION OF THE INVENTION

Cutting board system with bowl/container attachment member 5 comprises: a first diagonal support 12; a second diagonal support 14; a bowl/container attachment member 16; a block 20; and at least one bowl or container 50 with an L-shaped flange or rib 54.

Bowl/container attachment member 16 is a rigid rectangular or square shaped frame or support member. Bowl/container attachment member 16 is a rigid rectangular or square perimeter that is open or hollow in the middle of the rectangle. Bowl/container attachment member 16 has a first side, a second side, a third side, a fourth side, and a center. The first side of bowl/container attachment member 16 is a rigid oblong vertical planar member. First side has a width of about 0.25 to 6 inches, a length of about 6 to 60 inches, and a thickness of about 0.25 to 1.0 inches. First side has a first end, a second end, an upper edge, a lower edge, an inner surface, an outer surface, a longitudinal axis, and a latitudinal axis. First side may be metal, polymer, ceramic, glass, or any other known material. In best mode, first side is a solid metal planar member. The second side of bowl/container attachment member 16 is a rigid oblong vertical planar member. Second side has a width of about 0.25 to 6 inches, a length of about 6 to 60 inches, and a thickness of about 0.25 to 1.0 inches. Second side has a first end, a second end, an upper edge, a lower edge, an inner surface, an outer surface, a longitudinal axis, and a latitudinal axis. Second side may be metal, polymer, ceramic, glass, or any other known material. In best mode, second side is a solid metal planar member. The third side of bowl/container attachment member 16 is a rigid oblong vertical planar member. Third side has a width of about 0.25 to 6 inches, a length of about 6 to 60 inches, and a thickness of about 0.25 to 1.0 inches. Third side has a first end, a second end, an upper edge, a lower edge, an inner surface, an outer surface, a longitudinal axis, and a latitudinal axis. Third side may be metal, polymer, ceramic, glass, or any other known material. In best mode, third side is a solid metal planar member. The fourth side of bowl/container attachment member 16 is a rigid oblong vertical planar member. Fourth side has a width of about 0.25 to 6 inches, a length of about 6 to 60 inches, and a thickness of about 0.25 to 1.0 inches. Fourth side has a first end, a second end, an upper edge, a lower edge, an inner surface, an outer surface, a longitudinal axis, and a latitudinal axis. Fourth side may be metal, polymer, ceramic, glass, or any other known material. In best mode, fourth side is a solid metal planar member.

First, second, third, and forth sides of bowl/container attachment member 16 are rigidly attached together to form the rigid rectangular or square frame that is bowl/container attachment member 16. The first end of the first side of bowl/container attachment member 16 is rigidly attached to the second end of the fourth side of bowl/container attachment member 16 so their longitudinal axes are horizontal and perpendicular to each other and their latitudinal axes are vertical and parallel to each to each other. The second end of the first side of bowl/container attachment member 16 is rigidly attached to the first end of the second side of bowl/container attachment member 16 so their longitudinal axes are horizontal and perpendicular to each other and their latitudinal axes are vertical and parallel to each to each other. The second end of the second side of bowl/container attachment member 16 is rigidly attached to the first end of the third side of bowl/container attachment member 16 so their longitudinal axes are horizontal and perpendicular to each other and their latitudinal axes are vertical and parallel to each to each other. The second end of the third side of bowl/container attachment member 16 is rigidly attached to the first end of the fourth side of bowl/container attachment member 16 so their longitudinal axes are horizontal and perpendicular to each other and their latitudinal axes are vertical and parallel to each to each other. Rigid attachment may be accomplished by any know means such as weld, glue, epoxy, adhesive, bolts, screws, rivets, clips, snaps, pins, fasteners, or any other known means. The widths of first, second, third, and fourth sides of bowl/container attachment member 16 are equal so that bowl/container attachment member 16 forms a continuous vertical rim with equal width around the entire perimeter, where the upper edges of first, second, third, and fourth sides of bowl/container attachment member 16 are flush with each other and the lower edges of first, second, third, and fourth sides of bowl/container attachment member 16 are flush with each other.

Bowl/container attachment member 16 functions as a hanger or bracket on which an L-shaped flange or rib 54 on a bowl or container 50 is reversibly attached thereto. As discussed below, an L-shaped flange or rib 54 slides over one of the sides of bowl/container attachment member 16 to reversibly attached itself to the bowl/container attachment member 16 where it is held in place by gravity.

First diagonal support 12 and second diagonal support 14 are added to the hollow center of bowl/container attachment member 16 in order to add structural support to the bowl/container attachment member 16 and prevent it from bending, twisting, or defecting under weight or pressure from the cook when the cutting board system with bowl/container attachment member 5 is being used.

First diagonal support 12 is a rigid oblong horizontal planar member. First diagonal support 12 has a width of about 0.25 to 6 inches and a length of about 6 to 60 inches. First diagonal support 12 has a first end, a second end, an upper surface, a lower surface, a longitudinal axis, and a latitudinal axis. First diagonal support 12 may be metal, polymer, ceramic, glass, or any other known material. In best mode, first diagonal support 12 is a solid metal planar member. The first end of first diagonal support 12 is rigidly attached to the inside corner of bowl/container attachment member 16, where the first end of the fourth side of bowl/container attachment member 16 is rigidly attached to the second end of the third side of bowl/container attachment member 16, so that the latitudinal axis of first diagonal support 12 is horizontal and perpendicular to the latitudinal axes of first, second, third, and fourth sides of bowl/container attachment member 16, and the upper surface of first diagonal support 12 is flush with the upper edges of first, second, third, and fourth sides of bowl/container attachment member 16. The second end of first diagonal support 12 is rigidly attached to the inside corner of bowl/container attachment member 16, where the first end of the second side of bowl/container attachment member 16 is rigidly attached to the second end of the first side of bowl/container attachment member 16, so that the latitudinal axis of first diagonal support 12 is horizontal and perpendicular to the latitudinal axes of first, second, third, and fourth sides of bowl/container attachment member 16, and the upper surface of first diagonal support 12 is flush with the upper edges of first, second, third, and fourth sides of bowl/container attachment member 16. Rigid attachment may be accomplished by any know means such as weld, glue, epoxy, adhesive, bolts, screws, rivets, clips, snaps, pins, fasteners, or any other known means. In best mode, rigid attachment is accomplished by welding.

Second diagonal support 14 is a rigid oblong horizontal planar member. Second diagonal support 14 has a width of about 0.25 to 6 inches and a length of about 6 to 60 inches. Second diagonal support 14 has a first end, a second end, an upper surface, a lower surface, a longitudinal axis, and a latitudinal axis. Second diagonal support 14 may be metal, polymer, ceramic, glass, or any other known material. In best mode, second diagonal support 14 is a solid metal planar member. The first end of second diagonal support 14 is rigidly attached to the inside corner of bowl/container attachment member 16, where the first end of the third side of bowl/container attachment member 16 is rigidly attached to the second end of the second side of bowl/container attachment member 16, so that the latitudinal axis of second diagonal support 14 is horizontal and perpendicular to the latitudinal axes of first, second, third, and fourth sides of bowl/container attachment member 16, and the upper surface of second diagonal support 14 is flush with the upper edges of first, second, third, and fourth sides of bowl/container attachment member 16. The second end of second diagonal support 14 is rigidly attached to the inside corner of bowl/container attachment member 16, where the first end of the first side of bowl/container attachment member 16 is rigidly attached to the second end of the fourth side of bowl/container attachment member 16, so that the latitudinal axis of second diagonal support 14 is horizontal and perpendicular to the latitudinal axes of first, second, third, and fourth sides of bowl/container attachment member 16, and the upper surface of second diagonal support 14 is flush with the upper edges of first, second, third, and fourth sides of bowl/container attachment member 16. Rigid attachment may be accomplished by any know means such as weld, glue, epoxy, adhesive, bolts, screws, rivets, clips, snaps, pins, fasteners, or any other known means. In best mode, rigid attachment is accomplished by welding.

In this way, first and second diagonal supports 14,16 form an X-frame, X-shaped support structure, or diagonal support structure in the hollow center of bowl/container attachment member 16 to add considerable rigidity, stiffness, and support to bowl/container attachment member 16. As stated, first and second diagonal supports 14,16 are horizontal planar members while bowl/container attachment member 16 is a group of vertical planar members.

Optionally, four elastomeric or rubber feet 18 may be attached to the lower surfaces of first and second diagonal supports 12,14. Cutting board system with bowl/container attachment member 5 may further comprise four elastomeric or rubber feet 18. An elastomeric or rubber foot 18 is an elastomeric or rubber pad with an upper surface, a lower surface, and a height. The upper surfaces of two elastomeric or rubber feet 18 are rigidly attached to the lower surface of first diagonal supports 12 and the upper surface of the other two elastomeric or rubber feet 18 are rigidly attached to the lower surface of second diagonal support 14. The height of elastomeric or rubber feet 18 should be greater than the widths of first, second, third, and fourth sides of bowl/container attachment member 16. The four elastomeric or rubber feet 18 function to raise the bowl/container attachment member 16 above the surface or table on which the cutting board system with bowl/container attachment member 5 is placed. Without elastomeric or rubber feet 18, the bowl/container attachment member 16 would rest directly on the surface or table. The four elastomeric or rubber feet 18 also function to provide the cutting board system with bowl/container attachment member 5 with a firm grip on the surface or table. Without elastomeric or rubber feet 18, the bowl/container attachment member 16 may slide on the surface or table during use.

Block 20 is a rigid rectangular prism or cuboid shaped member. Block 20 has an upper surface, a lower surface, and a center. The lower surface of block 20 is rigidly attached to the upper surfaces of first and second diagonal supports 12,14 so that the center of block 20 is coincident with the center of bowl/container attachment member 16. Rigid attachment may be accomplished by any know means such as weld, glue, epoxy, adhesive, bolts, screws, rivets, clips, snaps, pins, fasteners, or any other known means. In best mode, rigid attachment is accomplished by fasteners inserted from lower surfaces of first and second diagonal supports 12,14 and extend into the lower surface of block 20. Block 20 has a width of about 6 to 60 inches, a length of about 6 to 60 inches, and a thickness of about 0.25 to 6 inches. The length of block 20 must be slightly less than that of bowl/container attachment member 16 to allow clearance space for the reversible attachment of bowl or container 50 onto bowl/container attachment member 16 and to allow for food to drop directly into bowl or container 50 as described below. This clearance space is about 0.25 to 1.0 inches. The width of block 20 must be slightly less than that of bowl/container attachment member 16 to allow clearance space for the reversible attachment of bowl or container 50 onto bowl/container attachment member 16 and to allow for food to drop directly into bowl or container 50 as described below. This clearance space is about 0.25 to 1.0 inches. In this way bowl/container attachment member 16 extends beyond the edges of block 20 and appears to be free floating around the entire edge or perimeter of block 20. Block 20 functions as a cutting board, cutting block, butcher block, or chopping block that is used to place food on top of and cut or chop the food thereon. Block 20 may be made of wood, Teflon, polymer, PTFE, or any other known type of material. In best mode, block 20 is made of wood.

Each bowl or container 50 is a bowl or container or a concave vessel used to hold contents such as food. Each bowl or container 50 has at least one straight brim, edge, or rim 52. As stated, bowl/container attachment member 16 is a rigid rectangular or square shaped frame or support member made of four straight sides or segments. Therefore, a straight portion of the brim, edge, or rim of bowl or container 50 is required to properly attach the bowl or container 50 to one of the four straight sides or segments of the bowl/container attachment member 16. A straight portion of the brim, edge, or rim 52 of bowl or container 50 can attach onto one of the four straight sides or segments of the bowl/container attachment member 16 without leaving any gaps or spaces there between. Gaps or spaces between the bowl or container 50 and one of the four straight sides or segments of the bowl/container attachment member 16 could allow for food to spill or drip through these gaps or spaces, which is undesirable. A bowl or container 50 may have one or more straight brims, edges, or rims 52. In best mode, bowl or container 50 has four straight brims, edges, or rims 52 to make the bowl or container 50 rectangular or square shaped and to allow for any side of the bowl or container 50 to properly attach to the bowl/container attachment member 16.

Each one straight brim, edge, or rim 52 on bowl or container 50 has an L-shaped flange or rib 54. L-shaped flange or rib 54 is a rigid flange or rib. L-shaped flange or rib 54 is a rigid bracket member comprised of two rigid planar members connected edge-to-edge or end-to-end to form an inverted L-shaped cross section where one planar member forms the long side/leg of the L-shape and the other planar member forms the short side/leg of the L-shape. The L-shaped cross section is inverted because the L-shape is upside down. The short side/leg of the L-shape is horizontal as depicted. The long side/leg of the L-shape is vertical as depicted. The end of the short side/leg is attached to the straight brim, edge, or rim 52 of the bowl or container 50 and is flush with the straight brim, edge, or rim 52 of the bowl or container 50 as depicted. The end of the long side/leg is not connected to anything and points downwards as depicted. The distance between the long side/leg and the outside surface of the bowl or container is determined by the length of the short side/leg of the L-shape. The distance between the long side/leg and the outside surface of the bowl or container must be slightly larger than the thickness of the bowl/container attachment member 16 so that the L-shaped flange or rib 54 may slide over the bowl/container attachment member 16 and hang there from the force of gravity. The distance between the long side/leg and the outside surface of the bowl or container, and thus the length of the short side/leg of the L-shape, must be sized to make a slip fit over the width of the bowl/container attachment member 16 and vice versa. The length of the long side/leg of the L-shape should be equivalent to or slightly less than the width of the bowl/container attachment member 16 and vice versa in order to provide as much bearing surface to as possible to L-shaped flange or rib 54 without extending beyond the width of the bowl/container attachment member 16. The L-shaped flange or rib 54 should span the whole length of the straight brim, edge, or rim 52 in order to provide as much bearing surface to as possible to L-shaped flange. The width of L-shaped flange or rib 54 should be equivalent to or slightly less than the length of the straight brim, edge, or rim 52 in order to provide as much bearing surface to as possible to L-shaped flange. There should not be any gaps or spaces in L-shaped flange or rib 54 in order to prevent food from spilling or dripping there through.

To use cutting board system with bowl/container attachment member 5, cutting board system with bowl/container attachment member 5 is positioned or placed onto a sturdy table or horizontal surface. Then food is placed onto block 20. Next the food is sliced, cut, chopped, or otherwise processed. Next a bowl or container 50 is attached to the bowl/container attachment member 16. Since the bowl/container attachment member 16 extends around the full perimeter of the cutting board, a bowl or container 50 may be attached to any and all sides of block 20. Then the processed food is pushed or slid from the block 20 into the bowl or container 50 without spilling or dripping food anywhere outside of the bowl or container 50.

Alternately, block 20 may also function as a base or support layer for an optional anti-slip pad 30 and an optional cutting surface 40. In this configuration, cutting board system with bowl/container attachment member 5 may further comprise: an anti-slip pad 30 and one or more cutting surfaces 40.

Anti-slip pad 30 is a rectangular or square planar member. Anti-slip pad 30 may be rigid or flexible. Anti-slip pad 30 is made of a material with a low coefficient of friction that is not slippery or slick. Anti-slip pad 30 functions to prevent a cutting surface 40 placed on top of the anti-slip pad 30 from slipping or moving during rigorous use of the cutting board system with bowl/container attachment member 5. Anti-slip pad 30 has a width slightly larger than that of block 20 and a length slightly larger than that of block 20. Anti-slip pad 30 has an upper surface and a lower surface. The upper surface of anti-slip pad 30 is flat. The lower surface of anti-slip pad 30 is reversibly attachable to the upper surface of block 20. The lower surface of anti-slip pad 30 has a square or rectangular shaped concave area or depression that functions to form a slip fit or a press fit with the upper surface of block 20. The square or rectangular shaped concave area or depression must have a width slightly larger than that of block 20 and a length slightly larger than that of block 20 so that the anti-slip pad 30 tightly fits over and onto the upper surface of block 20, similar to how a fitted sheet is attached to a mattress. When anti-slip pad 30 is fitted or mounted onto block 20, anti-slip pad 30 does not move or slide relative to block 20 even under rigorous use of the cutting board system with bowl/container attachment member 5. Anti-slip pad 30 may be made of any known material. In best mode, anti-slip pad 30 is made of anti-slip or low slip polymer, plastic, composite, or similar material.

Each of the one or more cutting surfaces 40 is a rectangular or square planar member. Cutting surface 40 may be rigid or flexible. Cutting surface 40 is made of a material with a high coefficient of friction that is more slippery or slick. Cutting surface 40 functions as a cutting surface to place food onto where it is sliced, cut, chopped, or otherwise processed. It is easier and more efficient to process food on a more slippery or slick surface. Cutting surface 40 has a width and length equivalent to those of bowl/container attachment member 16. In this way, the processed food can fall from the cutting surface 40 directly into an attached bowl or container 50. Cutting surface 40 has an upper surface and a lower surface. The upper surface is flat. The lower surface is flat. The lower surface of cutting surface 40 is placed onto the upper surface of anti-slip pad 30. Cutting surfaces 40 may be made of any known material. In best mode, cutting surfaces 40 are made of polymer, plastic, composite, or similar material.

In best mode, there are multiple cutting surfaces 40 for each cutting board system with bowl/container attachment member 5. In best mode, each of the multiple cutting surfaces 40 are in a different color wherein each separate color of cutting surface 40 is used for the processing of a certain food group. In best mode, cutting board system with bowl/container attachment member 5 comes with at least five multicolored cutting surfaces 40: a green colored cutting surface 40 for vegetables; a red colored cutting surface 40 for meat; a yellow colored cutting surface 40 for poultry; a blue colored cutting surface 40 for seafood; and a white colored cutting surface 40 for breads. If the cook needed to process meat, he would place the red cutting surface 40 onto the anti-slip pad 30, then place the meat on the red cutting surface 40, and process the meat. If the cook then needed to process vegetables, he would remove the red cutting surface 40 from the anti-slip pad 30, place the green cutting surface 40 onto the anti-slip pad 30, then place the vegetables on the green cutting surface 40, and process the vegetables. Of course, this procedure would be done without spilling or dripping any food onto the block 20 thereby keeping the block 20 clean and sterile. This method of operation will prevent any microbes or biological materials from passing between the meat and the vegetable and vice versa.

To use cutting board system with bowl/container attachment member 5 in this configuration, cutting board system with bowl/container attachment member 5 is positioned or placed onto a sturdy table or horizontal surface. The anti-slip pad 30 is then fitted or mounted onto the block 20. A cutting surface 40 is then placed onto anti-slip pad 30. Then food is placed onto the cutting surface 40. Next the food is sliced, cut, chopped, or otherwise processed. Next a bowl or container 50 is attached to the bowl/container attachment member 16. Since the bowl/container attachment member 16 extends around the full perimeter of the cutting board, a bowl or container 50 may be attached to any and all sides of block 20. Then the processed food is pushed or slid from the cutting surface 40 into the bowl or container 50 without spilling or dripping food anywhere outside of the bowl or container 50.

What is claimed is:

1. A cutting board comprising: a first diagonal support; a second diagonal support; a bowl or container attachment member; a block; and at least one bowl or container with an L-shaped flange or rib, wherein, said bowl or container attachment member is a rigid rectangular or square shaped frame or support member with a first side, a second side, a third side, a fourth side, and a center, said first side of said bowl or container attachment member is a rigid oblong vertical planar member with a first end, a second end, an upper edge, a lower edge, an inner surface, an outer surface, a longitudinal axis, and a latitudinal axis, said second side of said bowl or container attachment member is a rigid oblong vertical planar member with a first end, a second end, an upper edge, a lower edge, an inner surface, an outer surface, a longitudinal axis, and a latitudinal axis, said third side of said bowl or container attachment member is a rigid oblong vertical planar member with a first end, a second end, an upper edge, a lower edge, an inner surface, an outer surface, a longitudinal axis, and a latitudinal axis, said fourth side of said bowl or container attachment member is a rigid oblong vertical planar member with a first end, a second end, an upper edge, a lower edge, an inner surface, an outer surface, a longitudinal axis, and a latitudinal axis, said first end of said first side of said bowl or container attachment member is rigidly attached to said second end of said fourth side of said bowl or container attachment member, said second end of said first side of said bowl or container attachment member is rigidly attached to said first end of said second side of said bowl or container attachment member, said second end of said second side of said bowl or container attachment member is rigidly attached to said first end of said third side of said bowl or container attachment member, said second end of said third side of said bowl or container attachment member is rigidly attached to said first end of said fourth side of said bowl or container attachment member, said first diagonal support is a rigid oblong horizontal planar member with a first end, a second end, an upper surface, a lower surface, a longitudinal axis, and a latitudinal axis, said first end of said first diagonal support is rigidly attached to said first end of said fourth side of said bowl or container attachment member and to said second end of said third side of said bowl or container attachment member, said second end of said first diagonal support is rigidly attached to said first end of said second side of said bowl or container attachment member and to said second end of said first side of said bowl or container attachment member, said second diagonal support is a rigid oblong horizontal planar member with a first end, a second end, an upper surface, a lower surface, a longitudinal axis, and a latitudinal axis, said first end of said second diagonal support is rigidly attached to said first end of said third side of said bowl or container attachment member and to said second end of said second side of said bowl or container attachment member, said second end of said second diagonal support is rigidly attached to said first end of said first side of said bowl or container attachment member and to said fourth side of said bowl or container attachment member, said first and second diagonal supports form an X-frame, an X-shaped support structure, or a diagonal support structure across said center of said bowl or container attachment member, said block is a rigid rectangular prism or cuboid shaped member with an upper surface, a lower surface, and a center, said lower surface of said block is rigidly attached to said upper surfaces of said first and said second diagonal supports, said at least one bowl or container is a bowl or container or a concave vessel used to hold contents with at least one straight brim, edge, or rim, said at least one straight brim, edge, or rim has said L-shaped flange or rib, and said L-shaped flange or rib is a rigid flange or rib or a rigid bracket member comprised of two rigid planar members connected edge-to-edge or end-to-end to form an inverted L-shaped cross section where one planar member of said two rigid planar members forms a first leg of said inverted L-shaped cross section and the other planar member of said two rigid planar members forms a second leg of said inverted L-shaped cross section, wherein said first leg has a longer length than said second leg; wherein said inverted L-shaped cross section is inverted because the L-shape is upside down, said second leg is horizontal, and said first leg is vertical.

2. A cutting board as recited in claim 1, further comprising an anti-slip pad, wherein, said anti-slip pad is a rectangular or square planar member with an upper surface and a lower surface, said upper surface of said anti-slip pad is flat, said lower surface of said anti-slip pad is reversibly attachable to said upper surface of said block, and said lower surface of said anti-slip pad has a square or rectangular shaped concave area or depression that makes a slip fit or a press fit with said upper surface of said block.

3. A cutting board as recited in claim 2, further comprising one or more cutting surfaces, wherein, each said one or more cutting surfaces is a rectangular or square planar member with an upper surface and a lower surface, said upper surface of said one or more cutting surfaces is flat, said lower surface of said one or more cutting surfaces is flat, and said lower surface of said one or more cutting surfaces is placed onto said upper surface of said anti-slip pad.

4. A cutting board as recited in claim 3, wherein said one or more cutting surfaces comprises: a green colored cutting surface for vegetables; a red colored cutting surface for meat; a yellow colored cutting surface for poultry; a blue colored cutting surface for seafood; and a white colored cutting surface for breads.

* * * * *